United States Patent [19]

Ferrigno

[11] 3,899,346

[45] Aug. 12, 1975

[54] OPACITY MODIFIED PIGMENTARY COMPOSITIONS

[76] Inventor: Thomas Howard Ferrigno, 29 Clover Hill Cir., Trenton, N.J. 08638

[22] Filed: Apr. 30, 1973

[21] Appl. No.: 356,055

Related U.S. Application Data

[63] Continuation-in-part of Ser. No. 306,926, Nov. 15, 1972, Pat. No. 3,856,545.

[52] U.S. Cl. ............... 106/288; 106/40 R; 106/40 V
[51] Int. Cl.² ........................................... C09C 3/00
[58] Field of Search ............ 106/40 R, 40 V, 288 B

[56] References Cited
UNITED STATES PATENTS 2,046,295   6/1936   Nichols .............................. 106/288
3,503,771   3/1970   Kroyer .............................. 106/288

*Primary Examiner*—Winston A. Douglas
*Assistant Examiner*—John P. Sheehan
*Attorney, Agent, or Firm*—Sperry and Zoda

[57] ABSTRACT

White and other colored pigmentary compositions are produced by mixing a major portion of a comminuted anhydrous mineral possessing a relatively low refractive index with a minor portion of one or more inorganic opacifying and colorant agents having high refractive indices together with an inorganic binder. These materials are formed into agglomerates containing numerous particles bonded together by a calcining operation to providing a pigmentary product having high reflectance and opacity but a specific gravity lower than that of its constituents and possessing limited water absorption.

12 Claims, No Drawings

OPACITY MODIFIED PIGMENTARY COMPOSITIONS

This application is a continuation-in-part of applicant's copending application Ser. No. 306,926 filed Nov. 15, 1972 now U.S. Pat. No. 3,856,545.

FIELD OF INVENTION

In said copending application products and methods are described by which particles of anhydrous minerals possessing relatively low refractive indices are initially bonded together by an inorganic binder and formed into bodies or aggregates which are thereafter calcined to produce finished agglomerates containing numerous particles of the mineral material permanently bonded together and possessing relatively high reflectance and opacity, when dispersed in a medium of similarly low refractive index. The resulting agglomerates are white appearing and suitable for use as pigments and are characterized by specific gravites which are lower than those of the minerals from which they are made and have relatively low water absorptions.

While such products are adapted for use in many compositions, it is often desirable to provide pigmentary compositions having much greater opacity and reflectance and of various colors. It is, of course, known that plastics, coating compositions and the like can be made white and opaque by the use of conventional white pigments such as titanium dioxide, zinc oxide and the like, or can be given various colors by the use of suitable colorants such as iron oxide or the like. However, such pigments are expensive and the amount thereof required to assure effective opacity or coloration in paints, plastics, and the like, is considerably greater in cost than the pigmentary compositions of the present invention.

In accordance with the present invention, pigmentary materials having an opacity, reflectance, and color similar to those of relatively expensive pigments of the prior art are produced by forming agglomerates of the type described in said copending application wherein the major proportion of the constituents used in forming the agglomerates are minerals possessing low refractive index and a minor proportion of the constituents consist of one or more opacifying agents having high refractive index. The pigmentary composition thus obtained has a specific gravity less than that of the materials contained therein and limited water absorption.

PREFERRED EMBODIMENT

While the proportions and types of mineral and opacifying agents employed may be varied considerably, when producing white pigmentary compositions, the preferred embodiments of the present invention contain from about 70 to 98 parts by weight of one or more anhydrous minerals, from about 20 to 1 parts by weight of one or more white opacity modifying agents, and from about 10 to 1 parts by weight of an inorganic binder. When the pigmentary compositions are to have a color other than white the amount of the opacifying agent may be no more than a trace - that is about 0.001% - or may constitute as much as 10% by weight of the composition depending upon the intensity and color desired in the finished product.

The anhydrous mineral may be selected from a wide range of naturally occurring or treated minerals such as silica, alkali metal silicates, alumino silicates, alkali alumino silicates and mixtures thereof. Such mineral materials generally have refractive indices ranging from about 1.47 to 1.74 and very low opacities as demonstrated, for example, by the fact that when feldspar is comminuted and dispersed in a liquid medium having a similar refractive index, such as tricresyl phosphate, it exhibits little or no opacity. The preferred mineral which may be employed in the practice of the present invention is feldspar although many other anhydrous minerals particularly identified in said copending application may be used.

The opacity modifying agent or colorant employed may be selected from a wide range of conventional inorganic materials and mixtures thereof having a white or other color and refractive indices substantially exceeding those of the anhydrous minerals used in producing the finished product.

In general, those agents known as "ceramic colorants" which are used in ceramic compositions for their whitening, opacifying or coloring effects may be employed. Among such agents which are white in color are: titanium dioxide, both rutile and anatase; zirconium oxide; zirconium silicate; zirconium double silicates such as barium zirconium silicate, calcium zirconium silicate, magnesium zirconium silicate, zinc zirconium silicate, spinel which is zinc alumino silicate, zirconium carbonate, zinc oxide, zinc hydroxide, calcium titanium silicate, tin oxide, tin hydroxide, antimony oxide, arsenic oxide, sodium antimoniate, and the like, and mixtures thereof. Mixed minerals such as calcium carbonate and zirconium silicate may also be used to form a double silicate during the calcining operation employed in producing the finished pigmentary product.

Among those opacifying agents employed to produce pigmentary compositions having colors other than white are iron oxide, manganese oxide, lead chromate, sodium sulfo alumino silicate, ultramarine and a wide range of ceramic colorants many of which are of a complex of indefinite composition or of a proprietary nature.

Although the anhydrous forms of the opacifying agents are preferred, it is possible to use those hydrous forms thereof which do not adversely affect the properties of the pigmentary compositions during the calcining step employed in producing the product.

The anhydrous minerals used are employed in a comminuted form having an average particle size of less than 100 microns and preferably an average particle size in the range of about 2 to 40 microns. The opacifying or colorant agent generally has an average particle size which is less than that of the anhydrous mineral. Thus, titanium dioxide may range in average particle size from about 0.2 to about 4 microns and zinc oxide may have an average particle size of 0.15 micron. Other colorants may be used in the form of particles which are even smaller but in general they should not be larger than about 5 microns. These limitations are based on practically useful and available materials. High refractive index opacifying agents are generally more efficient when their average particle sizes are one-half the wavelength of visible light desired for reflectance. Thus, commercial grades of $TiO_2$ or $ZrO_2$ are graded for this effect by selecting particle sizes which will provide predominant reflectance in the blue wavelength; 0.2–0.25 microns.

The inorganic binder used in manufacturing the pigmentary materials of the present invention is also capable of wide variation. Thus, soluble silicates; glassy phosphates described in U.S. Pat. No. 3,127,238; expanding lattice montmorillonites and the like may be used.

In producing the products of the present invention, the anhydrous mineral and the opacifying agent are intimately and uniformly mixed together and the inorganic binder is added thereto in the form of a solution or dispersion with sufficient water to assure distribution of the binder throughout the mixture. The resulting mixtures are then formed into beads, pellets, spheroids or agglomerates containing numerous particles of the anhydrous mineral and opacifying agent. This may be accomplished by spraying a solution or dispersion of the binder into the dry mixture as it is fed to the pan of a rotating disc pelletizer or in a tumbling drum or by spray drying a fluid mixture of the particles and binder. The mixture may be passed through extruders or other forming or compacting equipment followed by a sizing operation to produce agglomerates containing numerous particles of the anhydrous mineral and opacifying agent temporarily bonded together and of the desired size and shape.

The resulting agglomerates are then dried by any suitable means until the water content thereof is reduced to about 0 to 10% by weight. The dried or semi-dried agglomerates are thereafter calcined at a temperature near or slightly below the melting point of the lowest melting constituent of the mineral and opacifying agent mixture employed. Calcining temperatures of about 1000°C to 1200°C are generally satisfactory with feldspar whereas temperatures which are somewhat higher or lower may be employed when other minerals are used. The resulting pigmentary compositions embodies agglomerates which may range in size from about 20 microns to 1 centimeter. For use in thin films, such as paints, the size range will generally be from about 20 to 50 microns. In thicker sections, such as plastic castings, caulks, and the like the pigmentary compositions may have sizes up to one centimeter although a more efficient range would be from about 100 to 1000 microns.

The individual agglomerates of the pigmentary compositions each contain numerous particles of the mineral and opacifying agent and have voids or cavities therein, as evidenced by the fact that the specific gravity of the pigmentary composition is found to be only about 60 to 95% of that of the non-volatile (at 100°C.) material of the composition. At the same time the pigmentary compositions have minor surface porosities as demonstrated by their limited absorption. A water absorption of less than 10% and preferably below 5% is preferred. Because of their low water absorption characteristics the pigmentary compositions of the present invention may be used to advantage in paints or the like without excessive absorption of liquid vehicle or an undesirable increase in viscosity.

The numerous internal facets of each individual agglomerate of the pigmentary composition present a multitude of light reflecting surfaces and since the opacifying agent is uniformly distributed throughout such surfaces, the pigmentary composition serves to supplement and materially increase the opacity and reflectance of the product. As a result, the products provide high opacities and are characterized by a brilliant white or other color and appearance despite the fact that the major portion of the composition is composed of mineral having a relatively low refractive index. Moreover, the opacity of the product and its color is retained when dispersed in liquid or other media having a refractive index approximately the same as that of the anhydrous mineral therein. For purposes of comparison when determining the opacity of white pigmentary compositions of the present invention the composition is placed upon a white opaque structure having a reflectance of about 84% at 550 millimicrons, the average wavelength of visible light, and compared with a freshly prepared MgO standard taken as 100%. Other standards prevalent in the paint industry may be used in evaluating products having other colors.

In order to illustrate typical methods and products in accordance with the present invention, the following examples are cited:

EXAMPLE I

A series of white products were made using 96 parts by weight of feldspar, 4 parts by weight of Bentonite L, and 35 parts by weight of water.

In product number 4 to 7 below from 1 to 20% by weight of zinc oxide was substitued for an equal weight of the feldspar. The feldspar particles ranged in size from about 0.5 to 100 microns and had an average particle size of 11 microns, a specific gravity of 2.64 and a refractive index of 1.53. Bentonite L is a product of Georgia Kaolin Company and was adjusted with sodium carbonate to 5% $Na_2O$. Its specific gravity was 2.5. Two zinc oxides having a specific gravity of 5.47 were employed, the one referred to as No. 30 had an average particle size of 0.15 microns and the other referred to as No. 44 had an average particle size of 0.51 microns.

The mixtures werer prepared as described above, formed into discs of about 1 centimeter by 2 milimeters and calcined as indicated whereby white pigmentary compositions were obtained.

The composition and properties of the products were as indicated below:

| Product Number | Opacifier, % by Wt. | Calcining, Minutes/C | % Water Absorp. | Specific Gravity | Calculated Sp. Gr. | % Reduction in Sp. Gr. |
|---|---|---|---|---|---|---|
| 1 | None | 10/1100°C | 2.2 | 2.37 | 2.63 | 9.8 |
| 2 | None | 10/1130°C | 0 | 2.26 | 2.63 | 14.0 |
| 3 | None | 5/1150°C | 1.8 | 2.34 | 2.63 | 10.9 |
| 4 | No. 30–20 parts | 10/1100°C | 0 | 2.50 | 2.93 | 14.7 |
| 5 | No. 30–10 parts | 10/1100°C | 0 | 2.52 | 2.77 | 9.0 |
| 6 | No. 30–1 part | 5/1150°C | 0 | 2.24 | 2.77 | 15.2 |
| 7 | No. 44–10 parts | 10/1100°C | 2.5 | 2.50 | 2.64 | 9.8 |

The products numbered 1, 2, and 3 contained no opacifying agent and are of the type described and claimed in copending application serial number 306,926. These were prepared for comparison with the products numbered 4 to 7 embodying the present invention. The products numbered 1, 2, and 3 had a white color but the products 4 to 7 had a brilliant white appearance and were very highly reflective (above 84%) even when immersed in tricresyl phosphate which has the same refractive index as the feldspar which constituted 80% or more of the product. The specific gravites of the constituents used were taken from published literature. The specific gravities of the pigmentary compositions were determined by water displacement. The reduction in specific gravity of the products is indicative of the presence of internal voids, or cavities, whereas the low water absorption of the products indicates that surfaces of minor porosity are obtained.

EXAMPLE II

Another series of white products was made as described above using a combination of opacifying agents consisting of zinc oxide and zirconium silicate. The zinc oxide was the No. 44 product of Example I and the zirconium silicate was a product known as TAM418 of NL Industries having a specific gravity of 4.5, a melting point of 1760°C, an infrared reflectance of 60 to 75%, an ultraviolet reflectance of 80 to 85%, an average particle size of 3.5 microns and a maximum iron oxide content of 0.045%.

EXAMPLE III

A further series of white products was made as described above using titanium dioxide as the opacifer. The product referred to below as A-WD was an anatase type having a minimum $TiO_2$ content of 98%, an average particle size of 0.3 microns and a specific gravity of 3.9. The product referred to below as FMA was also an anatase grade but having a minimum $TiO_2$ content of 99.4%, an average specific gravity of 4.0 and consisted of particles 60% of which were finer than 10 to 20 microns and 40% were finer than 5 to 10 microns. Both grades of the titanium dioxide have a refractive index of 2.7 when calcined and thereby converted to the rutile form.

| Product Number | Opacifier, % by Wt. | Calcining Min./C | % Water Absorp. | Specific Gravity | Calculated Sp. Gravity | % Reduction in Sp. Gr. |
|---|---|---|---|---|---|---|
| 14 | A-WD, 20 | 10/1100 | 2.1 | 2.52 | 2.81 | 10.3 |
| 15 | A-WD, 10 | 10/1100 | 2.4 | 2.28 | 2.71 | 15.9 |
| 16 | A-WD, 5 | 5/1150 | 0 | 2.32 | 2.67 | 13.1 |
| 17 | A-WD, 1 | 5/1150 | 0 | 2.25 | 2.63 | 14.4 |
| 18 | FMA, 5 | 5/1150 | 2.0 | 2.44 | 2.67 | 8.7 |
| 19 | FMA, 1 | 5/1150 | 0 | 2.33 | 2.63 | 11.6 |

Each of these products exhibited notably low water absorption and a substantial reduction in the specific gravity for the pigmentary composition as compared with that of the materials from which they were made. All of the products were brilliant white, had a reflectance above 84% and were completely opaque in low refractive index media despite the fact that products Nos. 17 and 19 contained only 1% of titanium dioxide and products Nos. 16 and 18 contained only 5% of $TiO_2$. The product No. 14 containing 20% of $TiO_2$ developed a pale yellow color on calcining. However, this can be overcome by the use of a small amount of antimony oxide in the composition. The products containing 5% and 10% exhibited only a very slight yellow coloration.

In calcining the pigmentary compositions of the pres-

| Product Number | Opacifier, % by Wt. | Calcining, Minutes/C | % Water Absorp. | Specific Gravity | Calculated Sp. Gravity | % Reduction in Sp. Gr. |
|---|---|---|---|---|---|---|
| 8 | No. 44–10 TAM 418–10 | 10/1100 | 2.5 | 2.50 | 2.77 | 9.8 |
| 9 | No. 44–10 TAM 418–10 | 5/1150 | 6.0 | 2.54 | 2.74 | 7.3 |
| 10 | No. 44–5 TAM 418–5 | 10/1100 | 1.4 | 2.50 | 2.76 | 9.3 |
| 11 | No. 44–5 TAM 418–5 | 5/1150 | 2.0 | 2.42 | 2.70 | 10.3 |
| 12 | No. 44–5 TAM 418–5 | 5/1150 | 5.4 | 2.46 | 2.68 | 8.3 |
| 13 | No. 44–2.5 | 5/1150 | 2.41 | 2.69 | 2.69 | 10.4 |

Each of these products was a brilliant white and had a reflectance above 84% although the amount of the opacifying agents therein constituted only 5 to 20% of the product. At the same time, the ultraviolet and infrared reflectance of the opacifying agents in the pigmentary compositions will serve to protect compositions in which they are present from the degrading effects of radiation.

ent invention, the atmosphere in which the calcining operation is carried out may be modified. Thus, for example, when iron impurities are present in either the mineral or opacifying agent, a reducing atmosphere may be used during calcining whereby the iron present may be reduced to a ferrous state having a little or no tinctorial value. Further, if desired, traces or minor concentrations of tinctorial agents having a blue or violet tone can be added to produce a more brilliant white appearance.

In producing pigmentary compositions in accordance with the present invention which have a color other than white, a wide variety of natural and synthetic coloring agents may be used as opacifying agents. The specific color obtained in any particular case will depend upon the chromogen or metallic element present as well as its valence state. Many ceramic colorants adapted for use as opacifying agents are of complex composition or of a proprietary nature and not capable of ready analysis. Nevertheless, substantially any of such agents which are not transistory or significantly altered in color during the calcining process may be used. However, those metallic salts, such as copper carbonate, which yield the oxide or produce very fine powders as colorants during the calcining step may also be employed.

For most purposes when producing pigmentary compositions having a color other than white the proportion of the constituents employed are about as follows in parts by weight:

|  | Generic | Preferred |
|---|---|---|
| Anhydrous mineral | 80 to 99 | 89 to 98 |
| Inorganic binder | 1 to 10 | 2 to 6 |
| Opacifying agent | trace to 10 | trace to 5 |

In order to illustrate typical non-white pigmentary compositions produced in accordance with the present invention, the following example is cited:

EXAMPLE IV

A series of products were made as described above in which the opacifying agents were an underglaze color producted by B. F. Drakenfeld & Co. identified as Crimson 4228; an underglaze color produced by B. F. Drakenfeld & Co. identified as Black 4101; and a product of Columbia Carbon Co. identified as Mapico 422 which is a synthetic iron oxide containing 98% iron oxide and having a predominant particle size in the range of 0.3 to 1.2 microns. The specific gravity of the Crimson 4228 was about 5.2; that of Black 4101 was about 4.0 and that of Mapico 422 was 5.18.

In producing the products 96.7 parts by weight of feldspar and 3.3 parts by weight of Bentonite L adjusted to a 5% Na$_2$O content were used, together with colorants as indicated in the following table. The agglomerated products were hand formed discs having dimensions of about 8mm by 2mm calcined for 5 minutes at about 1150°C.

has a color other than white. Accordingly, as little as one part by weight of the chromogen in 5000 parts by weight of the composition, or 0.02% of the opacifying agent may be used. In fact, in producing products having pale tints no more than 0.001% (herein referred as a "trace amount") of the opacifying agent may be required. On the other hand the amount of the colored opacifying agent employed may constitute as much as 10% by weight of the pigmentary composition although a maximum of about 5% by weight is generally preferred. Thus a complete spectrum of colors and shades may be obtained in producing products embodying the present invention. Moreover, because of the low specific gravity of the products and the low concentration of the colorants or opacifying agents required to obtain intense colors, the pigmentary compostions may be produced at considerable saving in cost and it is possible to achieve pigmentary effects not attainable heretofore.

Because of dissimilarites in the wetting and dispersion characteristics of the anhydrous minerals and opacifying agents which may be employed, it is sometimes advantageous to use minor amounts of wetting and dispersing agents in the preparation of the pigmentary compositions.

It will be apparent from the foregoing description and examples that the invention is capable of many variations and modifications. Accordingly, it should be understood that the particular examples shown and described are intended to be illustrative only and are not intended to limit the scope of the invention.

I claim:

1. A pigmentary composition comprising calcined agglomerates consisting essentially of from about 70 to 98 parts by weight of anhydrous minerals having a refractive index of from about 1.47 to 1.74 and selected from the group consisting of silica, alkali metal silicates, alkali alumino silicates and mixtures thereof; from about 1 to 10 parts by weight of an inorganic binder selected from the group consisting of soluble silicates, sodium polyphosphates and expanding lattice montmorillonites; and an opacifying agent consisting of an inorganic colorant having a refractive index exceeding that of the mineral in the composition, said inorganic colorant being selected from the group consisting of white inorganic colorants and inorganic colorants having a color other than white and when said colorant is white it is present in an amount of from about 1 to 20 parts by weight and when said colorant has a color other than white it is present in an amount of from 0.001 to 10% by weight, said anhydrous minerals being in the form of

| Agent, % Conc. | Actual Sp. Gr. | Calc. Sp. Gr. | % Reduction of Sp. Gr. | % Water Absorp. | Color |
|---|---|---|---|---|---|
| None — | 2.29 | 2.63 | 12.9 | 1.0 | White |
| U.G.4228, 0.04 | — | — | — | — | Pale Pink |
| U.G.4228, 0.24 | — | — | — | — | Pink |
| U.G.4228, 0.95 | — | — | — | — | Light red |
| U.G.4228, 8.78 | 2.35 | 2.75 | 14.5 | 0.5 | Deep Red |
| U.G.4101, 0.14 | 2.38 | 2.63 | 9.5 | 5.0 | Light Gray |
| U.G.4101, 4.6 | 2.30 | 2.67 | 13.9 | 0 | Black |
| Map. 422, 0.14 | 2.18 | 2.63 | 17.1 | 0 | Pale Pink |
| Map. 422, 4.6 | 2.16 | 2.69 | 19.7 | 3.7 | Dark red-brown |

It will be noted from the foregoing table that the amount of opacifying agent employed when producing pigmentary compositions embodying the present invention may be quite small particularly when the product particles having an average particle size of from about 2 to 40 microns which are bonded together in the form of agglomerates ranging in size from about 20 microns to 1 centimeter and having voids therein such that the specific gravity of the agglomerates is in the range of from about 60 to 95% of that of the inorganic material in the composition.

2. A pigmentary composition as defined in claim 1 wherein said anhydrous mineral is feldspar.

3. A pigmentary composition as defined in claim 1 wherein said opacifying agent has an average particle size which is less than that of the anhydrous mineral.

4. A pigmentary composition as defined in claim 1 having a water absorption in the range of about 0 to 5%.

5. A white pigmentary compostion as defined in claim 1 wherein the anhydrous material is feldspar having an average particle size less than about 20 microns and the agglomerated product contains from about 1 to 20 parts by weight of a white opacifying agent.

6. A white pigmentary composition as defined in claim 1 wherein said opacifying agent is selected from the group consisting of titanium dioxide, zirconium oxide, zirconium silicate, zirconium double silicates, zinc alumino zirconium silicate, zirconium carbonate, zinc oxide, zinc hydroxide, calcium titanium silicate, tin oxide, tin hydroxide, antimony oxide, arsenic oxide, sodium antimoniate and, mixtures thereof.

7. A white pigmentary composition as defined in claim 1 wherein said opacifying agent is zirconium silicate.

8. A pigmentary composition as defined in claim 1 wherein said opacifying agent has a color other than white.

9. A pigmentary compostion as defined in claim 1 wherein said opacifying agent has a color other than white and is present in an amount equal to from about .001 to 10 parts by weight of the composition.

10. A pigmentary composition as defined in claim 1 wherein said opacifying agent is iron oxide.

11. A pigmentary composition as defined in claim 1 wherein said opacifying agent is ultramarine.

12. A pigmentary composition comprising calcined agglomerates each consisting essentially of from about 70 to 98 parts by weight of feldspar in the form of particles having an average particle size less than 100 microns, from about 1 to 20 parts by weight of a white inorganic opacifying agent having a refractive index exceeding that of the feldspar and an average particle size less than that of the feldspar, said particles being bonded together by an inorganic binder, and said agglomerates having voids therein and a specific gravity at least 5% below the calculated specific gravity of the constituents of which they are composed.

* * * * *